United States Patent [19]
Roberts et al.

[11] Patent Number: 5,658,161
[45] Date of Patent: Aug. 19, 1997

[54] CREATIVE ASSESSMENT METHOD

[75] Inventors: Marilyn K. Roberts; Peggy J. Chiovitti-Moritz, both of Denver, Colo.

[73] Assignee: School Dis. #1 in the City & County of Denver, State of Colorado, Denver, Colo.

[21] Appl. No.: 337,974

[22] Filed: Nov. 14, 1994

[51] Int. Cl.$^6$ ....................................................... G09B 3/06
[52] U.S. Cl. ............................ 434/353; 434/363; 434/178
[58] Field of Search ................................... 434/353, 354, 434/363, 178

[56] References Cited

U.S. PATENT DOCUMENTS

| | | | |
|---|---|---|---|
| 2,137,447 | 11/1938 | Ellis | 434/353 |
| 3,266,049 | 8/1966 | Parmenter | 434/363 |
| 3,827,165 | 8/1974 | Jacobson | 434/354 |
| 4,478,584 | 10/1984 | Kaney | 434/353 |
| 4,650,426 | 3/1987 | Brigance | 434/178 X |

Primary Examiner—Jeffrey A. Smith
Attorney, Agent, or Firm—John E. Reilly

[57] ABSTRACT

A system for assessing a student's knowledge of a subject is disclosed which includes an assessment sheet or booklet which has a story portion setting forth a plurality of related facts or observations therein and an activity portion setting forth a plurality of questions and directions therein to the student requiring a written response by the student, an answer area for the student to place written responses therein and a machine readable teacher scoring area on the sheet. The scoring area has machine readable spaces therein for recording numbers or marks characteristic of predetermined categories of the teacher's evaluation of the student's responses to the questions and directions in accordance with a predetermined set of assessment criteria. In other embodiments, the answer sheet may be separable from a reusable assessment booklet.

13 Claims, 7 Drawing Sheets

Jack Laser's Galactic Fun World

Student Name _______________

Teacher _______________ Period _______

School _______________ Grade _______

You and a friend have been talking about the ultimate high school graduation celebration. You both agree that a trip to Jack Laser's Galactic Fun World in Jupiter, Florida, would be awesome. After a little research, you learn the following per person costs:

- $90 per person per night for a double room at a Jack Laser Resort Hotel
- $15 per day for food
- $280 round-trip airfare
- $125 gate admission to the theme park (1-week special rate).

Starting Line

Work Area

1. Using these figures, calculate the cost for both you and your friend to spend a week (seven days, six nights) at Jack Laser's Galactic Fun World.

Lodging Costs _______________
   Food Costs _______________
   Airfare Cost _______________
   Gate Admission _______________
   Final Answer _______________

2. Calculate the percentage of the total cost for each category described in problem one. Use the adjacent circle to create a circle graph of your data. Round percentages to the nearest whole percent. Be sure to label each expense category correctly.

3. Create a scenario of how you could reduce the cost of your trip by 25 percent. Use your graph to help you identify the categories that you would cut.

4. You and your friend have prepared a budget of $1900 for the trip based on today's prices. If the inflation rate is 5% per year, how much should you plan to have with you when you take the trip in the twelfth grade? Complete the chart below to determine the cost in four years. (Round all amounts to the nearest dollar.)

| Grade Level | 8th | 9th | 10th | 11th | 12th |
|---|---|---|---|---|---|
| Budget Amount | $1900 | $1995 | | | |
| Inflation Amount | $95 | | | | |
| Total Amount | $1995 | | | | Final Answer |

DO NOT WRITE IN THIS AREA
Teacher Scoring Bubbles
1. ① ② ③ ④
2. ① ② ③ ④
3. ① ② ③ ④
4. ① ② ③ ④

Jack Laser's Galactic Fun World
Grade 8 — Mathematics
Teacher Scoring Rubric

20

26

Item 1 Scoring Rubic
- ① SUPERIOR RESPONSE (Score of 4)
  Performs all needed operations; calculates all answers correctly.
- ② SATISFACTORY RESPONSE (Score of 3)
  Performs all needed operations; calculates most answers correctly.
- ③ MINIMAL RESPONSE (Score of 2)
  Performs most needed operations; makes minor errors in calculations.
- ④ LITTLE OR NO RESPONSE (Score of 1)
  Does not perform needed operations; makes major errors in calculations Answers
Lodging Costs......$1080
Food Costs......$210
Airfare Costs......$560
Gate Admission......$250
*Final Answer......$2100

Item 2 Scoring Rubric
- ① SUPERIOR RESPONSE (Score of 4)
  Performs all calculations correctly; correctly draws graph.
- ② SATISFACTORY RESPONSE (Score of 3)
  Performs most calculations correctly; correctly draws graph.
- ③ MINIMAL RESPONSE (Score of 2)
  Performs some calculations correctly; draws circle graph incorrectly indicates percentages.
- ④ LITTLE OR NO RESPONSE (Score of 0)
  Does not draw accurate graph.

Answers

Item 3
- ① SUPERIOR RESPONSE (Score of 4)
  Describes scenario based on graph; accurately reduces cost by 25%.
- ② SATISFACTORY RESPONSE (Score of 3)
  Describes scenario based on graph; reduces costs by significantly more or less than 25%.
- ③ MINIMAL RESPONSE (Score of 2)
  Describes scenario without referring to graph; reduces costs without indicating amount of reduction.
- ④ LITTLE OR NO RESPONSE (Score of 0)
  Does not describe scenario that would reduce costs.

Item 4
- ① SUPERIOR RESPONSE (Score of 4)
  Performs all needed operations; calculates all answers correctly.
- ② SATISFACTORY RESPONSE (Score of 3)
  Performs all needed operations; calculates most answers correctly.
- ③ MINIMAL RESPONSE (Score of 2)
  Performs most needed operations; makes minor errors in calculations.
- ④ LITTLE OR NO RESPONSE (Score of 0)
  Does not perform needed operations; makes major errors in calculations.

Answers

| Grade Level | 8th | 9th | 10th | 11th | 12th |
|---|---|---|---|---|---|
| Budget Amount | $1900 | $1995 | $2095 | $2200 | $2310 |
| Inflation Amount | $95 | $100 | $105 | $110 | |
| Total Amount | $1995 | $2095 | $2200 | $2310 | |

Honeycomb Hunt
Instructions

You are a fearless adventure seeker who has found a rolled up paper stuck in a hole in a tree. On the paper is a poem. The poem gives directions to a treasure. Where should you go? How can you find the treasure?

On the other side of the rolled up piece of paper you find these sentences:

"The Honeycomb Maze is where you begin, to seek the treasure you hope to win. Addition, multiplication, and division, will lead you to a glorious vision."

After a long journey, you arrive at the Honeycomb Maze. You discover that the Honeycomb isn't made with honey at all. It's made of numbered tiles and surrounded by six different treasure chests. Only one chest holds the treasure, but which one is it?

Then you see fifteen different math problems. Now you think to yourself, "Ah-ha! To find the hidden treasure of the Honeycomb maze, all I have to do is solve the math problems. Then, I'll use my answers to find the trail through the Honeycomb Maze."

Since you know your math, you feel rich already!

Follow the directions carefully, and mark your answers on the Student Response Form.

---

Enter there, oh fearless one,
Only where the side's sum is twenty-one.
This side will make you smile,
But others lead to a dead end tile.
Don't stop here. You are not done.
Look at the problems. Do number one.
Number one will start your trip.
The answer tells you the correct first stop.
Then on to do problem two.
That is the next tile for you..
Go only into that tile: Do not stray.
Or the treasure of the Honeycomb may go away.
After doing problem two,
Answer three is the right tile for you.
Do each problem in the order shown
To find the path through the honeycomb.
Go right on through, tile by tile,
And you will find in a little while
You come out on another side,
And a treasure chest will be on your side.
Go around the chest that you see.
A rich person you will be.

CREATIVE ASSESSMENT METHOD

BACKGROUND AND FIELD OF INVENTION

This invention generally relates to tests and assessment methods; and more particularly to an assessment system and method for demonstrating a student's creative reasoning and measuring student learning relative to predetermined criteria.

Traditional methods of testing student learning and mastery of a particular subject such as history, government, science, and mathematics generally involve assembling a series of questions relating to the subject matter taught and requiring the student to answer the questions, provide an explanation or perform calculations. These tests either are of a subjective type, requiring an explanatory answer, or are of an objective type, requiring the student to select an answer from a limited choice of possibilities. Traditional test methods of these types do not readily measure in a consistent manner the student's reasoning and creative ability, or the ability to reach beyond the immediately learned material to apply learned knowledge to new factual situations. In addition, the tests usually are not viewed by students as a challenge or "fun" to execute.

Accordingly there is a need for a system for evaluating the working knowledge level of a student relating to a subject in accordance with readily measurable criteria in a way which maintains the student's interest and ensures the objectivity as much as possible of the teacher's evaluation of the student responses. In addition, there is a need for an assessment system that is readily machine readable for data evaluation and overall assessment of student performance. There is also a need for a system of testing which is flexible, cost affective, and appeals to students with a variety of learning styles and cultural backgrounds.

SUMMARY OF THE INVENTION

The system in accordance with the present invention is designed to measure student learning with two or more commonly known content outcomes or standards. Teachers choose when assessments are administered, and, because they fit into the regular continuum of classroom activities, they become an integral part of instruction. The system utilizes highly engaging projects to stimulate student interest. The style of questions for each project is determined by asking "What is the best, most fun way of finding out if a student knows, or can apply knowledge of this subject?" The system in accordance with the present invention provides an in-depth "dipstick view" of how well students can apply learned knowledge in a new situation.

A first embodiment of the system in accordance with the present invention comprises in combination an assessment sheet setting forth a plurality of related facts or observations in a story portion and an activity portion on the sheet which sets forth the plurality of questions and directions to the student requiring a written response by the student. The assessment sheet also has an answer area on the sheet for the student to place written responses and a teacher scoring area having at least one set of machine-readable spaces for recording the teacher's evaluation of the student's response to the questions and/or directions. The teacher's evaluation consists of selecting one of several characters, each of which represent the student's level of response. The machine-readable spaces in the teacher's scoring area are designed to be used in conjunction with a predetermined set of assessment criteria for the teacher. A separate teacher's instruction sheet containing the set of criteria, model answers and directions for administering the assessment to the student is also provided.

A second embodiment in accordance with the present invention comprises in combination an assessment sheet or booklet having a story portion setting forth a plurality of related facts and an activity portion setting forth a plurality of questions and/or directions to the student. A separate answer sheet or one that is separable from the booklet is provided which has an answer area for the student to place written responses therein, and a teacher's scoring area having at least one set of machine-readable spaces for recording the teacher's evaluation of the student's responses. As in the first embodiment, the machine-readable spaces for the teacher's evaluation correspond in number for use with the predetermined set of assessment criteria which is provided on a separate teacher's instruction sheet or sheets which also contains directions for administering the assessment to the student, model answers, and definitions of evaluation categories for the assessment criteria.

The assessment sheet or booklet which has the story and the questions and directions to the student may be a separate booklet from the answer sheet so that the assessment booklet may be reused many times with different students. The answer sheet may provide lines for a written response by the student, space for drawings, computations, or machine-readable answer areas in addition to the separate teacher's scoring area.

A separate teacher's instruction sheet contains the definitions of evaluation categories from which the teacher must choose to characterize his or her evaluation of the student's responses. The categories are designed in accordance with a predetermined set of assessment criteria geared specifically to the subject matter being assessed.

The activity portion of the assessment sheet preferably includes at least one or more questions which requires a creative written response by the student demonstrating a use of knowledge external to the set of facts or observations set forth in the story portion. This feature is designed to test the student's reasoned response and/or creative ability to apply learned information to a new situation. The predetermined set of assessment criteria for the teacher's evaluation is designed to assess the application of previously learned information to the new set of circumstances or facts.

The above and other objects of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 1 is a plan view of a student instruction and answer sheet in a first preferred embodiment of the assessment system of the invention;

FIG. 5 is a plan view of a student answer sheet for the second embodiment of the invention;

DETAILED DESCRIPTION OF PREFERRED EMBODIMENT

Figure 2:
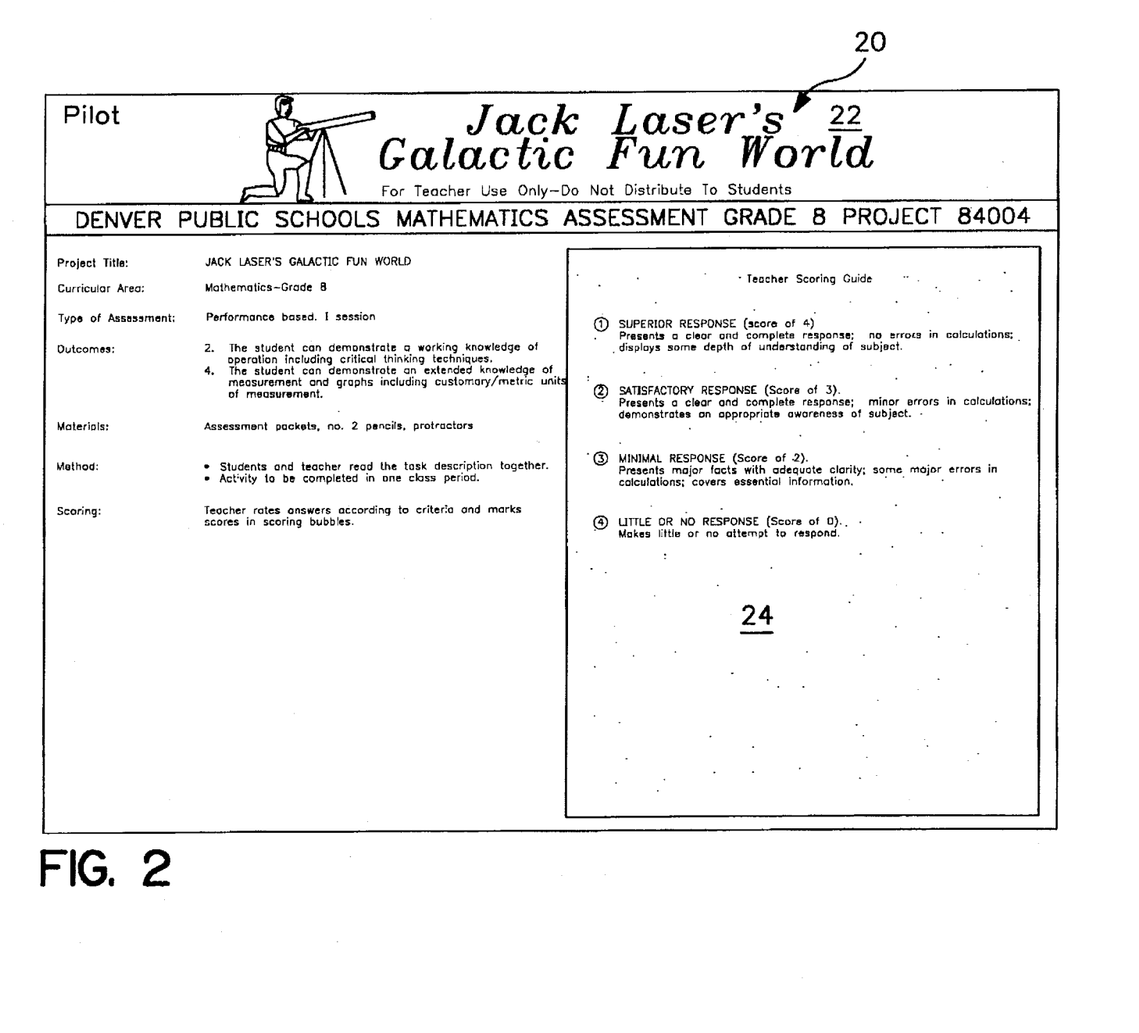
FIG. 2 is a plan view of the front side of a teacher instruction sheet for the first embodiment of the assessment system in accordance with the invention shown in FIG. 1.
Figure 3:
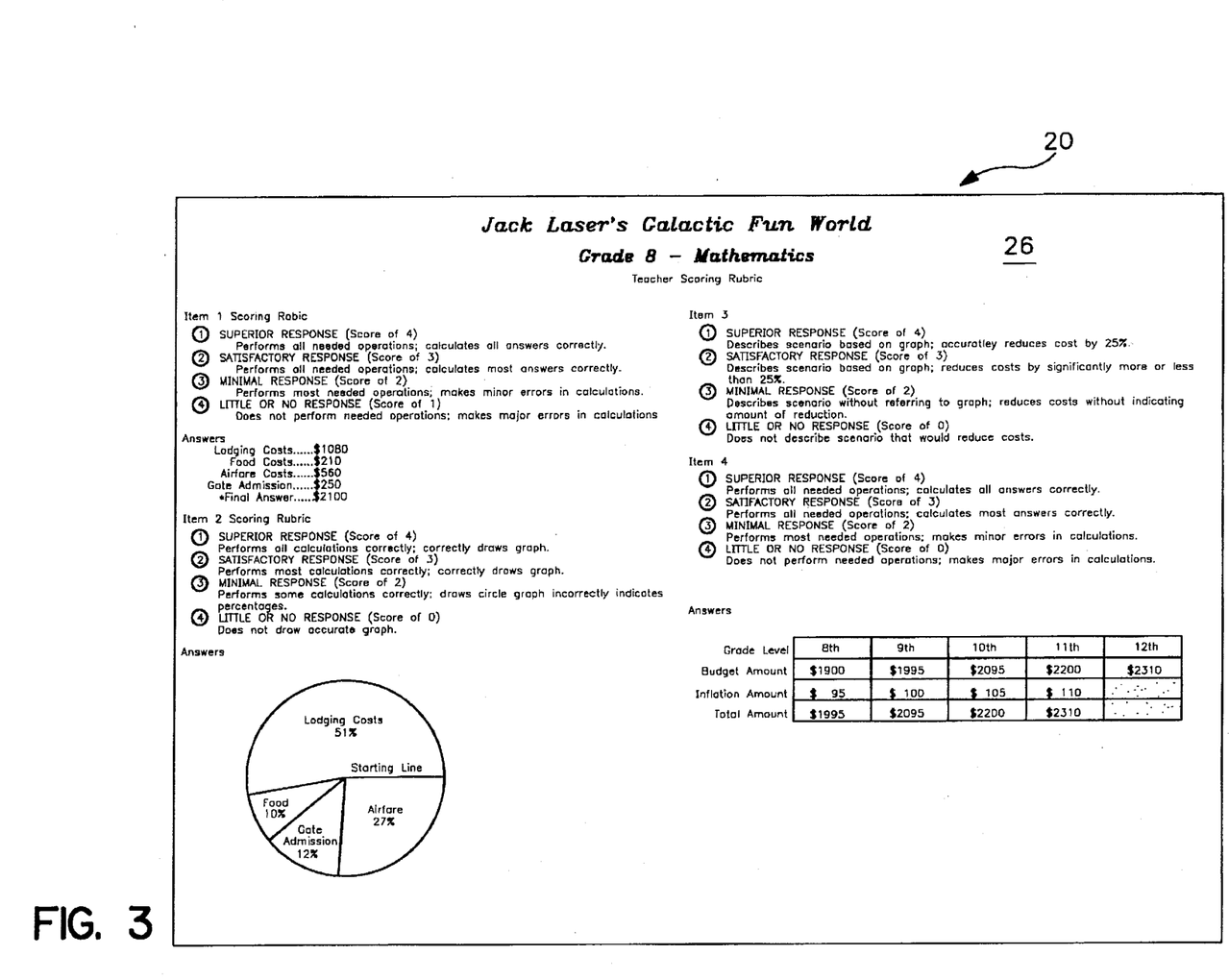
FIG. 3 is a plan view of the back side of the teacher instruction sheet shown in FIG. 2.
Figure 4:
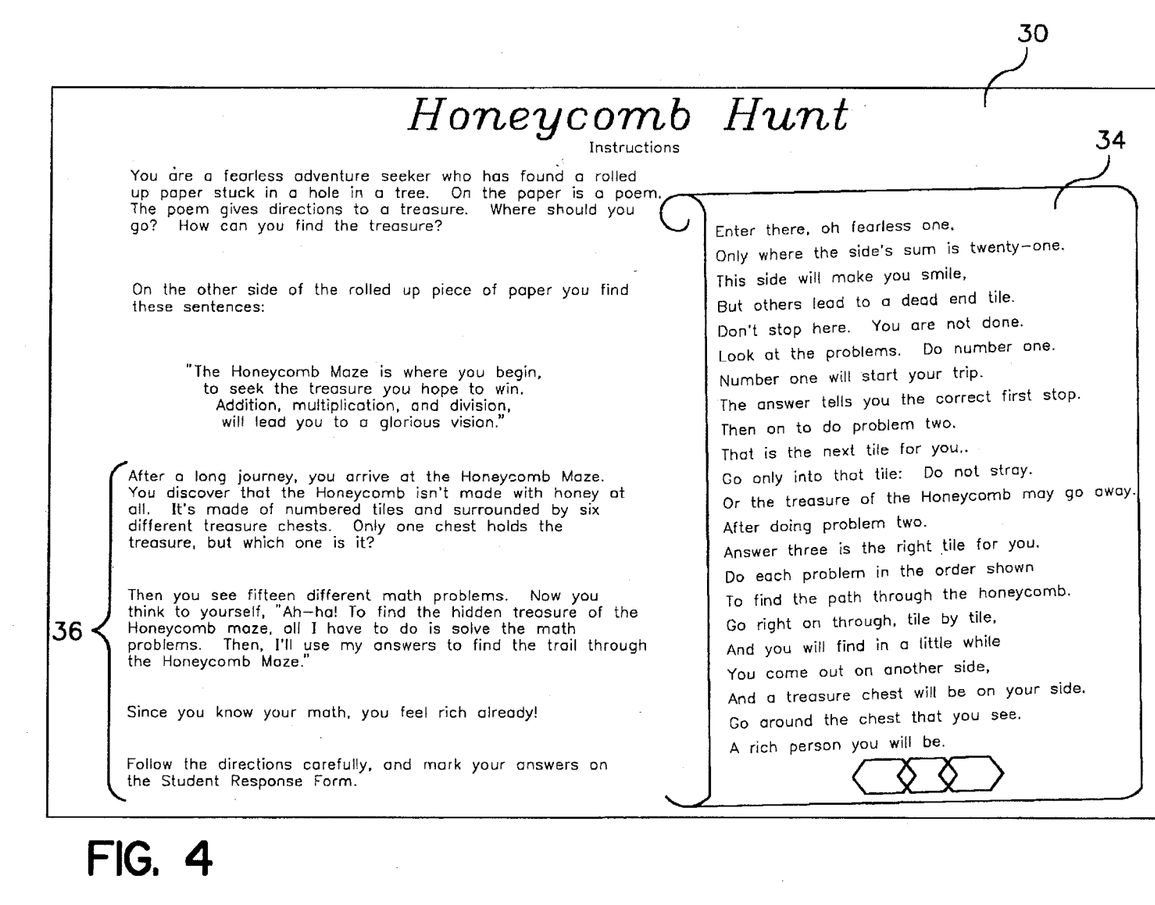
FIG. 4 is a plan view of a student instruction sheet in a second embodiment of the assessment system in accordance with the invention.

Turning now to the drawings, a first preferred embodiment of the creative assessment system in accordance with the present invention is shown in FIGS. 1, 2 and 3. In this first embodiment, the assessment sheet 10 is entitled "Jack Laser's Galactic Fun World". The title and facts set forth in this first embodiment are merely illustrative. Many other examples are to be envisioned and are within the scope of the present invention.

The assessment sheet 10 has an area 12 for student and class identification which may be machine-readable in a conventional manner. In this example, the assessment sheet 10 includes a story portion 14 which sets forth the plurality of related facts. In this case, the student and a friend are think about a trip and learn facts related to the cost of such a trip.

Using the facts set forth in the story portion 14, the student is then asked to calculate or perform tasks in an activity portion 16. The student is asked to place his or her answers on the assessment sheet in appropriate spaces provided. The assessment sheet also has a teacher's scoring area 18 which has, in this example, four sets of four machine-readable, numbered "bubbles" B in which the teacher records his or her evaluation of the student's responses provided in the answer area 16.

The front side of a teacher's instruction sheet 20 is shown in FIG. 2. The front side 22 presents a general teacher's scoring guide 24 to provide the evaluation categories for the assessment criteria which are generally applied to each of the questions set forth in the activity portion 16 the assessment sheet 10. In addition, the instruction sheet contains directions to the teacher for administering the assessment to the student.

The back side 26 of the instruction sheet 20 contains an answer key and rubric for teacher's scoring and defines in more detail the assessment criteria as applied to each of the questions set forth in the activity portion 16.

Each of the questions set forth in the activity portion in "Jack Laser's Galactic Fun World" requires the student to use knowledge external of the set of facts or observations 14. For example, in Question 1, the student is required to demonstrate knowledge of addition and multiplication. In Question 2, the student is required to demonstrate his knowledge of graphmaking. In Question 3, the student is asked to creatively modify the facts given to change the results, i.e., the costs in order to achieve a stated goal of cost reduction. This question particularly requires a creative response on the part of the student.

The teacher scores the assessment 10 by utilizing the rubric set forth in the teacher's scoring guide 26 and enters his or her evaluation by selecting one of the characters representing the level of response in the teacher's scoring bubbles B in the teacher's scoring area 18 on the student's assessment sheet 10. The assessment sheets 10 are then machine-read into a central computer. The results can be tabulated and compiled for all students and appropriate teacher's and student reports generated. In addition, parent reports may be automatically generated identifying the subject matter examined, student performance, and performance in relation to others taking the same assessment.

A second preferred embodiment of the assessment system in accordance with the present invention is illustrated in FIGS. 4 through 7. In this embodiment, the instructions to the student are provided on a separate story sheet 30 and a separate student answer sheet 32. As in the first embodiment, the second embodiment of the assessment system is shown with a merely illustrative set of facts entitled the "Honeycomb Hunt". The student instruction sheet and student answer sheet may be in the form of the inside pages of a bifolded booklet or they may be separate sheets of paper. In some cases, the student instruction may require more than one page. In those instances, the student instruction booklet may be provided separate from the student answer sheet 32. However, for illustration and discussion purposes here, a single sheet 30 shown in FIG. 4 will suffice. The student instruction sheet 30 contains a story portion 34 which comprises a rolled-up piece of paper having a poem thereon and an activity portion 36 setting forth the instructions to the student.

The student answer sheet 32 has areas 40 and 42 in which the student is to place written responses. In addition, the answer sheet 32 has a teacher's scoring area 44 which has machine-readable bubbles B' for recording the teacher's evaluation of the student's responses. Again, the machine-readable spaces or bubbles B' are representative of categories determined in accordance with the predetermined set of criteria. The teacher's scoring area 44 on the answer sheet 32 contains three sets of four machine-scorable bubbles B', one for addition, one for multiplication and one set for division.

Figure 6:
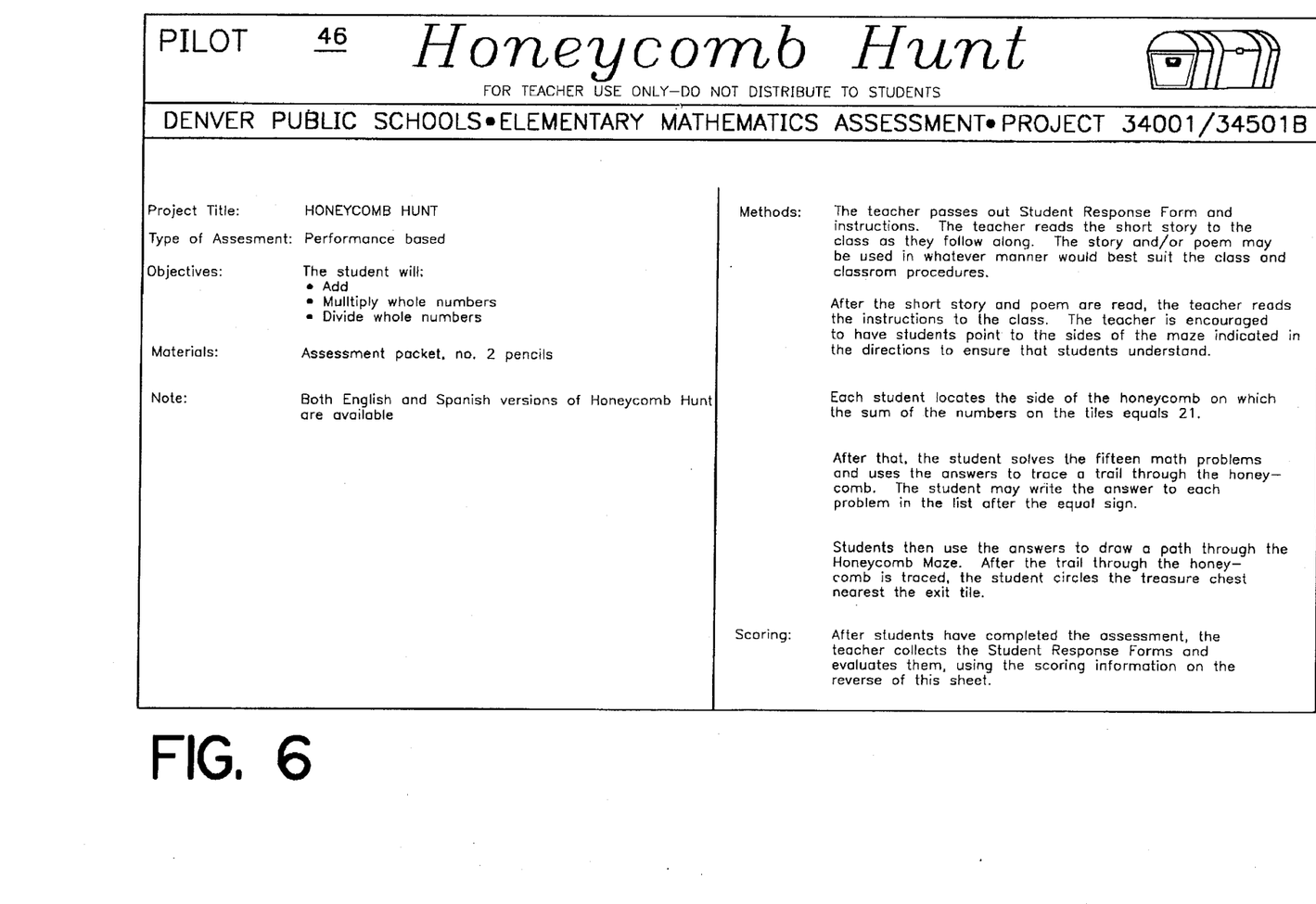
FIG. 6 is a plan view of the front side of a teacher instruction sheet for the second embodiment of the invention.
Figure 7:
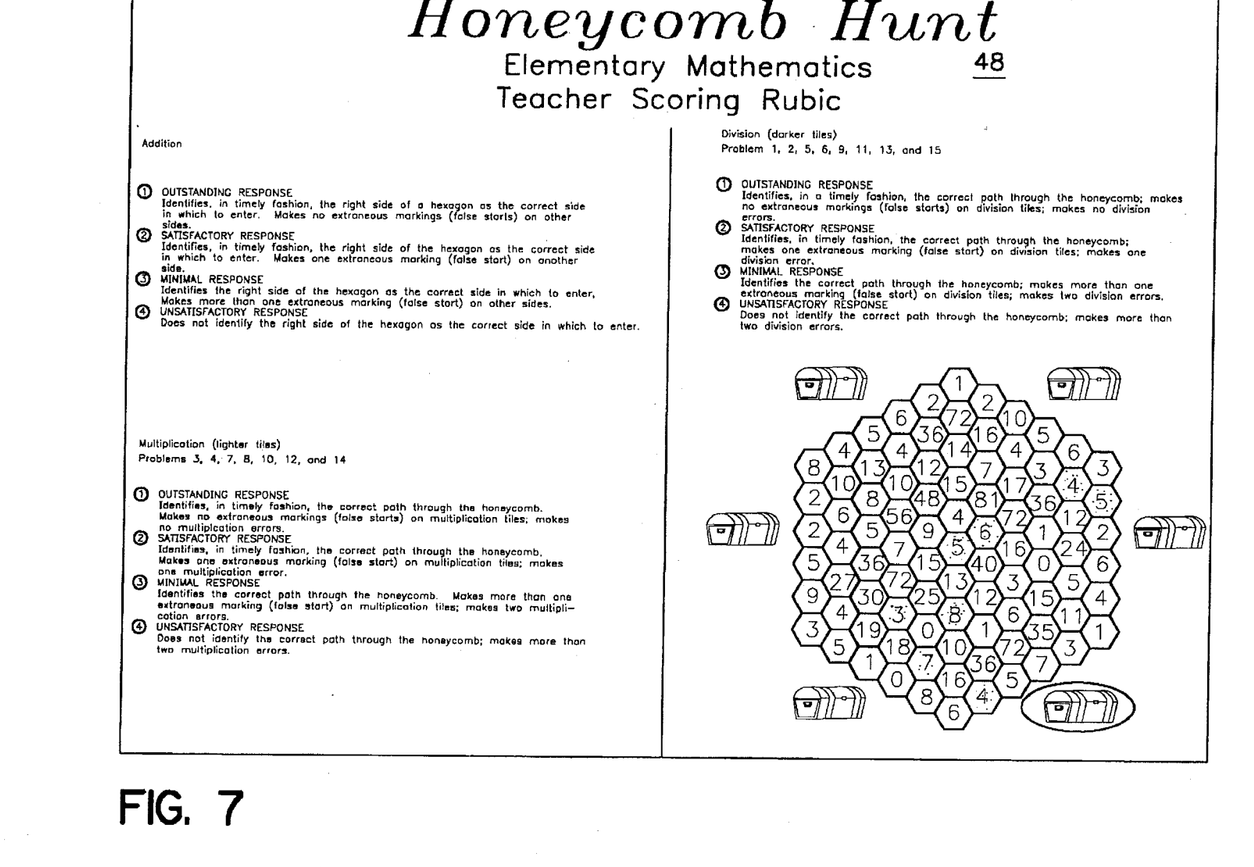
FIG. 7 is a plan view of the back side of the teacher instruction sheet shown in FIG. 6.

The instructions to the teacher are set forth on the front side of the teacher's instruction sheet 46. The predetermined set of assessment criteria is set forth in the teacher's scoring rubric 48 shown in FIG. 7. On the teacher's scoring rubric side 48 of the teacher's instruction sheet 46, course assessment criteria for each of the three activity categories is set forth.

In both the first and second embodiments, the teacher's evaluation of the student responses is broken down into four categories: outstanding response, satisfactory response, minimal response, and unsatisfactory response each represented by a character which may be in the form of a numerical value, such as, "1", "2", "3" and "4". This arrangement and definition of response categories permits a more in-depth evaluation of the student responses than does the simple right and wrong grading technique typically encountered but does so in accordance with measurable standards which are more accurate and consistent than purely subjective grading. The system thus provides a meaningful in-depth view of how well students can apply learned knowledge to a new situation and does so in an interesting way.

The method of assessing a student's knowledge of a subject in accordance with the present invention uses a predetermined set of assessment criteria. The method comprises the steps of (1) providing to the student an assessment booklet or sheet having a story portion therein, setting forth a plurality of related facts or observations and an activity portion setting forth a plurality of questions and directions to the student; (2) providing to the teacher an instruction sheet setting forth the predetermined set of assessment criteria for evaluating the student's responses to the questions and directions; (3) requiring a written response by the student to the questions on an answer sheet having areas for the student to place written responses thereon; (4) evaluating the student's responses in accordance with the set of predetermined assessment criteria; and (5) recording in a machine-readable teacher's scoring area on the answer sheet the teacher's evaluation of the student's responses to the questions and directions in machine-readable bubbles therein.

The teacher records a mark on the answer sheet in the machine-readable bubble B or B' corresponding to a demonstrated performance level by the student in accordance with the predetermined set of assessment criteria which typically involves the selection of a space or "bubble" containing a numerical value 1, 2, 3 or 4 or of a character representing each of four categories of response level expected of the student as defined by the assessment criteria.

The answer sheet, thus marked, is then read into a computer so that the results may be tallied and compared to other students in other classes taking the same examination. In addition, a machine-readable teacher scoring area provides a quantitative measure of the performance of the student directly on the answer sheet. This provides convenient and immediate feedback to the student.

The machine-readable form of the teacher's evaluation facilitates expeditious preparation of teacher status reports, student progress reports, overall student progress evaluation, and parent reports which can provide to them a meaningful "dipstick" look at their children's progress.

While the system and method of the invention have been described with reference to specific embodiments thereof, it is to be understood that various changes, modifications and variations may be made which are within the scope of the invention. For example, the assessment booklet may be a separate sequential listing of questions associated with one or more sets of facts. The answer sheet may include a plurality of machine-readable bubbles in addition to student answer work area to areas for answers which must be teacher evaluated.

Accordingly, it is intended that all such changes, modifications, and variations are within the scope and fair meaning of the following claims. All patents, patent applications and publications referenced herein are hereby incorporated by reference in their entirety.

I claim:

1. A method for assessing a student's knowledge of a subject comprising the steps of:
   providing to the student an assessment sheet including a story portion setting forth a plurality of related facts or observations therein and an activity portion setting forth a plurality of questions based on said related facts or observations in ascending numerical order, each said question requiring a written response by the student;
   requiring a written response by the student on a response portion on said assessment sheet adjacent to one of said story portion and activity portion wherein said response portion is provided with blank areas in the same numerical order as said questions for said student to place said written response thereto;
   evaluating the student's response to each said question on a teacher instruction sheet containing a predetermined number of assessment criteria and assigning a character to each of said assessment criteria; and
   recording on a teacher scoring portion on said assessment sheet in spaced relation to said response portion and proximate to an edge of said assessment sheet having machine readable spaces therein the teacher's evaluation of the student's response to said questions in the same numerical order as said questions and said responses, each said space containing said characters from which one of said characters is selected by the teacher to represent the level of response to each said question.

2. The method according to claim 1, wherein said teacher's instruction sheet contains definitions of evaluation categories from which the teacher must choose to characterize her evaluation of the student responses.

3. The method according to claim 2, wherein said plurality of questions requires at least one creative written response from the student demonstrating a use of knowledge external to said set of facts or observations.

4. The method according to claim 2, wherein said spaces in said teacher scoring portion correspond to said evaluation categories.

5. The method according to claim 1 wherein said level of response is selected from the group consisting of "outstanding", "satisfactory", "minimal", and "unsatisfactory".

6. The method according to claim 1 wherein each said character is represented by a different numerical value.

7. A method for assessing a student's knowledge of a subject comprising the steps of:
   providing to the student an assessment booklet having a story portion setting forth a plurality of related facts or observations therein and an activity portion setting forth a plurality of questions based on said related facts or observations, said questions arranged vertically in ascending numerical order and each requiring a written response by the student;
   requiring a written response by the student on a separable answer sheet provided with blank response areas in the same numerical order as said questions for said student to place said written responses therein;
   evaluating the student's response to each said question on a teacher instruction sheet containing a predetermined number of assessment criteria and assigning a character to each of said assessment criteria; and
   recording the teacher's evaluation of the student's response to each said question in a teacher scoring portion on said answer sheet in spaced relation to said response areas and proximate to an edge of said answer sheet, said scoring portion having machine readable spaces arranged therein in the same numerical order as said questions and said responses, each of said spaces containing characters from which one of said characters is selected by the teacher to represent the level of response to each said question.

8. The method according to claim 7, further comprising a separate teacher's instruction sheet containing said set of criteria and directions for administering said assessment to said student.

9. The method according to claim 8, wherein said plurality of questions requires a creative written response from the student.

10. A method of assessing a student's knowledge of a subject using a predetermined set of assessment criteria comprising the steps of:
    providing to the student an assessment booklet having a story portion therein setting forth a plurality of related facts or observations and an activity portion setting forth a plurality of questions based on said related facts and observations in ascending numerical order, each requiring a written response by the student;
    requiring a written response by the student to said questions on a separable answer sheet having blank areas for said student to place said written response thereon, said blank areas arranged in the same numerical order as said questions;
    evaluating said responses in accordance with a predetermined set of assessment criteria; and
    recording the teacher's evaluation of the student's responses to said questions in a machine readable teacher scoring area on said answer sheet having machine readable spaces therein in the same numerical order as said questions and said response, said spaces containing characters from which one of said characters is selected by the teacher to represent the level of response to each said question.

11. The method according to claim 10, wherein said step of recording comprises assigning a numerical value to said teachers evaluation of each student answer corresponding to a demonstrated performance level by said student and marking a machine readable space corresponding to said numerical value in said machine readable teacher scoring area on said separable answer sheet.

12. The method according to claim 11, wherein said method further comprises machine reading said teacher's evaluations on said answer sheet into a computer and generating reports therefrom.

13. The method according to claim 12, wherein one of said reports is a parent's report setting forth a score for the student for the subject area assessed and a description of the subject assessed.

* * * * *